United States Patent Office 3,283,029
Patented Nov. 1, 1966

3,283,029
HYDRAULIC FLUIDS
Michel Louis Lucien Brilland and Pierre Anthelme Tardy, Le Havre, France, assignors to Compagnie Francaise de Raffinage, Paris, France
No Drawing. Filed Sept. 25, 1963, Ser. No. 311,321
Claims priority, application France, Sept. 26, 1962, 910,547, Patent 1,357,634
4 Claims. (Cl. 260—683.9)

This invention relates to hydraulic fluids such as are used in very many control systems, for example brakes for aircraft undercarriages, signs and signals and, in general, any form of mechanical or electromechanical device in which a force is transmitted by a liquid, and in hydraulic and hydropneumatic damping devices.

Fluids for uses of this kind must comply with several conditions which are usually as follows: their freezing point must be low enough for them to stay liquid down to very low temperatures, and their boiling point must be high enough for them not to boil in operation. They must have a high viscosity index, to ensure that their viscosity varies little with temperature and that viscosity remains low at very low temperatures. Also, they must not attack the metals and alloys of the fluid circuits, nor must they dissolve nor cause to swell the various rubbers and elastomers used for gaskets.

The limit characteristics of hydraulic fluids are laid down in stringent specifications such as, for instance, the specification of United States Automotive Engineer Society, such as specifications SAE 70 R, SAE 71 R[1], the latter relating more particularly to mineral-based fluids.

It is difficult to find purely hydrocarbon bases of a petroleum origin which meet these specifications, and so there have been many suggestions for formulae based on synthetic organic compounds, such as silicone oils, glycols, glycol polyethers and so on. However, products of this kind are usually expensive, and so from the cost point of view petroleum products have a definite advantage.

In the petroleum industry it is very common to polymerise propylene, isobutylene and n-butylenes on acid catalysts, such as phosphoric acid deposited on carbon, or on kieselguhr or other supports. This treatment leads to homopolymers (dimers, trimers, tetramers, pentamers) and/or heteropolymers which are complex iso-olefin mixtures. Of the many known uses of such products, it may be mentioned that diisobutylene after hydrogenation to 2,2,4-trimethylpentane, is classified as a high-octane fuel, that the dodecenes forming the butylene trimers or—and preferably—the propylene tetramers, are used in the manufacture of dodecylbenzene, which is a detergent base, that the heptenes resulting from the copolymerisation of propylene and butylene or of polymers, and the octenes and nonenes originating respectively from the dimersation and trimerisation of butylenes and propylene, are useful basis for Oxo synthesis.

The research in connection herewith has shown that very valuable hydraulic fluid bases can be formed by isoparaffin mixtures having from 12 to 18 carbon atoms and resulting from hydrogenation of the polymers or oligomers of light olefins, such as propylene or the butylenes or isobutylene.

This invention has for its object, in the first place to provide hydraulic fluids of this kind, which are distinguished more particularly by their low freezing point and their high viscosity index, and in the second place to provide a process for the preparation of such fluids from the polymers specified. The underlying idea of the process according to the invention is:

(1) To separate in such polymers by distillation a cut having an initial point above 175° C. and preferably distilling at from 200 to 300° C. and meeting the specifications of the required fluid as regards both the initial and final point of distillation of the A.S.T.M. (American Society for Testing Methods).

Particular attention should be paid to adjusting the initial point to obtain a flash point in accordance with the specifications, and to the final point, to adjust the viscosity to the required level.

(2) And then to effect total hydrogenation of the ethylene bonds of such cut. Within the scope of the invention, this hydrogenation can be performed by any known means, more particularly on a nickel or nickel molybdate catalyst, and continues until a saturated product having a substantially zero bromine value is yielded.

The following examples illustrate processes to provide hydraulic fluid bases according to this invention.

*Example 1*

A mixture of polymers having an initial point of 262° C. and a final point of 312° C. and a density $D_4^{15}$ 0.821 is prepared by polymerisation of propylene on a phosphoric-acid-based catalyst on kieselguhr at 190° C. at a pressure of 60 kg./cm.$^2$. This product is fractionated to separate a cut having an initial point of 257° C., a final point of 292° C., a density of 0.817 at 15° C. and a bromine value of 74.5. The product is hydrogenated continuously on a nickel catalyst at a temperature of 190° C. and a pressure of 10 km./cm.$^2$.

The hydrogenate thus produced can be used directly as a hydraulic fluid base with the following characteristics:

| | |
|---|---|
| Density at 15° C. | 0.808 |
| Refractive index at 20° C. | 1.4483 |
| Distillation A.S.T.M.: | |
| Initial point, ° C. | 246 |
| 50% point, ° C. | 276 |
| Final point, ° C. | 298 |
| Flash point (Cleveland) ° C. | 122 |
| Viscosity at −40° C., cs. | 420 |
| Viscosity at +100° C., cs. | 4.58 |
| "Pour point" A.S.T.M., ° C. | <−70 |

This product is satisfactorily inert to various kinds of synthetic rubber, as the following test shows where a specimen experienced, at 70° C. for 168 hours, the compared action of a control spindle and of the foregoing fluid according to the invention.

The following Table I shows the measured increases in size of the specimens as caused by the two liquids.

TABLE I

| Specimens | Hydraulic fluid base according to the invention | Reference Spindle |
|---|---|---|
| Synthetic rubber No. 1 | 11.3% Vol | 29.5% Vol. |
| Synthetic rubber No. 2 | 3.7% Vol | 40.0% Vol. |
| Synthetic rubber No. 3 | −2% Vol | 0.4% Vol. |

Without departing from the scope of this invention, the total polymers or copolymers resulting from polymerisation of the olefins can be hydrogenated to yield a mixture of saturated isoparaffins having a zero bromine value, whereafter this mixture is subsequently fractionated to separate a cut having an initial point above 150° C. and complying as nearly as possible with the distillation, flashpoint and viscosity specifications of the required hydraulic fluid.

The hydraulic fluid bases formed by hydrogenated polymers, as hereinbefore described, are compatible with the normal viscosity dopes and with antiwear additives.

By way of example, the following Table II gives the characteristics of the two hydraulic fluids (compositions A and B) prepared from such bases with the appropriate dopes, and which are more particularly intended to be used in hydraulic circuits of automobiles.

TABLE II

|  | Base No. 1 | Composition A | Composition B |
|---|---|---|---|
| Composition, Wt. Percent: | | | |
| (1) Base | 100 | 83 | 85.5 |
| (2) Additives: | | | |
| Polymethacrylate of alkyl X | | 15 | 0 |
| Polymethacrylate of alkyl Y | | 0 | 12.5 |
| Tricresyl phosphate | | 1 | 1 |
| Oleic esters | | 1 | 1 |
| Characteristics: | | | |
| Density at 15° C | 0.808 | 0.826 | 0.823 |
| Distillation A.S.T.M.: | | | |
| Initial point (° C.) | 246 | 247 | 246 |
| 50% | 276.5 | 272.5 | 274.5 |
| Final point | 298 | 299 | 307 |
| Viscosity (cs.) at: | | | |
| −40° C | 420 | 1,200 | 1,100 |
| +100° F | 4.58 | 17.06 | 15.48 |
| 50° C | | 12.9 | 12 |
| 210° F | | 5.69 | 5.58 |
| Viscosity index | | 207 | 215.6 |
| "Pour point" A.S.T.M. ° C | <−70 | <−65 | −61 |
| Flash point (Cleveland) | 122 | 128 | 131 |
| Sulphur, p.p.m | 11 | <0.05 | <0.05 |

These compositions behave well in relation to synthetic rubber, as the following Table III shows; Table III gives the swelling of a synthetic rubber specimen after being treated at 121° C. for 70 hours with the base and the foregoing mixtures and with a reference spindle and various commercial brake liquids.

TABLE III

Treatment at 121° C. for
70 h. with—                       Percent swelling
    Base _____ 14.7
    Composition A _____ 18.7
    Composition B _____ 17.6

TABLE III—Continued

Treatment at 121° C. for
70 h. with—                       Percent swelling
    Spindle _____ 33
    Brake liquid L _____ 25.8
    Brake liquid M _____ 26.2
    Brake liquid N _____ 52.3

*Example II*

By polymerisation of propylene on a phosphoric-acid-based catalyst on kieselguhr at 190° C. at a pressure of 54 kg./cm.$^2$, there is obtained, after fractionation a mixture of polymers having an initial point of 199° C., a final point of 313° C., a density $D_4^{15}=0.800$ and a bromine value of 81. The product is hydrogenated continuously on a nickel catalyst at a temperature of 190° C. at a pressure of 10 kg./cm.$^2$.

The hydrogenated fraction thus obtained has the following characteristics:

Density at 15° C. _____ 0.791
Refractive index at 20° C. _____ 1.4395
Distillation A.S.T.M.:
    Initial point, ° C. _____ 215
    50% point, ° C. _____ 235
    Final point, ° C. _____ 270
Flash point (Cleveland), ° C. _____ 90
Viscosity at −40° C., cs. _____ 55
Viscosity at +100° C., cs. _____ 2.41
"Pour point" A.S.T.M, ° C. _____ <−70
Aniline point, ° C. _____ 87

This product, mixed in suitable proportions with the hydrogenate of Example I, provides a base for hydraulic fluids more particularly useful in aviation.

The following Table IV gives the characteristics of two hydraulic fluids (compositions C and D) prepared from this base (base No. 2) which are compared with the principal requirements of the American specification MIL–H–5606A (Hydraulic Fluid—Petroleum Base—Aircraft).

TABLE IV

|  | Base No. 2 | Composition C | Composition D | American Specification MIL H5606A |
|---|---|---|---|---|
| Composition, wt. percent: | | | | |
| (1) Mineral base | 100 | 81.5 | 80.5 | |
| (2) Additives: | | | | |
| Polymethacrylate of alkyl X | | 16.5 | | |
| Polymethacrylate of alkyl Z | | | 18.5 | |
| Tricresyl phosphate | | 0.5 | 0.5 | |
| Trialkyl phenol | | 0.5 | 0.5 | |
| Characteristics: | | | | |
| Density at 15° C | 0.797 | 0.820 | 0.817 | |
| Distillation A.S.T.M.: | | | | |
| Initial point (° C.) | 219 | | | |
| 50% Point | 247 | | | |
| Final Point | 285 | | | |
| Viscosity (cs.) at: | | | | |
| −40° C | 92 | 419 | 448 | 500 maximum. |
| 100° F | 2.88 | 13.99 | 14.20 | |
| 130° F | | 10.52 | 10.23 | 10 minimum. |
| 210° F | | 5.94 | 5.30 | |
| Viscosity index | | 222 | 224 | |
| "Pour point" ASTM (° C.) | <−70 | <−68 | <−68 | −59 maximum. |
| Flash point Cleveland (° C.) | 98 | 96 | 96 | 93 minimum. |
| Aniline point (° C.) | 89.4 | 88 | 89 | |
| Swelling of synthetic rubber <(168 h. at 70° C.)—Change in volume (percent). | | +16 | +16.6 | +19 to +26.5. |
| Test for Oxidation Corrosion (168 h. at 121° C.)—Change in weight of test pieces after test (mg./cm.$^2$): | | | | |
| Aluminium | | 0.00 | 0.00 | <0.2. |
| Steel | | 0.00 | 0.00 | <0.2. |
| Copper | | −0.03 | −0.08 | <0.6. |
| Cadmium Steel | | −0.02 | 0.00 | <0.2. |
| Magnesium | | 0.00 | +0.01 | <0.2. |
| Change in viscosity of oil at 130° F. after test (percent). | | +6.5 | +5.7 | From −5 to +20. |
| Change in acid index of oil after test (mg. KoH/g.). | | +0.04 | 0.0 | <0.2. |

We claim:

1. A process for the preparation of stable mixtures of saturated petroleum hydrocarbon polymers having low freezing points and high boiling points and high viscosity indexes, said mixtures being substantially non-corrosive to metals and substantially inert to rubbers and like elastomers and being particularly adapted for use as hydraulic fluids, which comprises the steps of subjecting a mixture of light olefins to catalytic polymerization to form a mixture of olefinic polymers substantially all of which contain about 12 to 18 carbon atoms per molecule, separating from said mixtures of polymers a fraction having a boiling range of about 200° to 300° C., and subjecting said separated fraction to catalytic hydrogenation until said olefinic polymers have a substantially zero bromine value.

2. A process as recited in claim 1 in which said light olefins are substantially all selected from the group consisting of 3-carbon and 4-carbon olefins.

3. A new composition of matter particularly adapted for use as hydraulic fluids and comprising a mixture of branched chain petroleum hydrocarbon polymers having about 12 to 18 carbon atoms per molecule and having a substantially zero bromine value, said mixture having a boiling range of about 215° to 298° C. and a high viscosity index.

4. A new composition of matter as recited in claim 3 which also includes an additive component for adjusting viscosity and other characteristics of said composition, which additive component is selected from the group consisting of polymethacrylates of alkyl compounds, tricresyl phosphate, trialkyl phenol, and mixtures thereof.

References Cited by the Examiner

UNITED STATES PATENTS

| | | | |
|---|---|---|---|
| 2,961,330 | 11/1960 | Meriwether | 260—683.9 |
| 3,003,009 | 10/1961 | Gurd et al. | 260—683.9 |
| 3,100,808 | 8/1963 | Dyer | 208—18 |
| 3,156,736 | 10/1964 | Southern et al. | 260—683.9 |

DELBERT E. GANTZ, *Primary Examiner.*

S. P. JONES, *Assistant Examiner.*